Patented Jan. 28, 1936

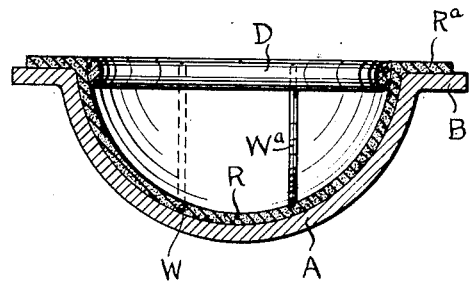
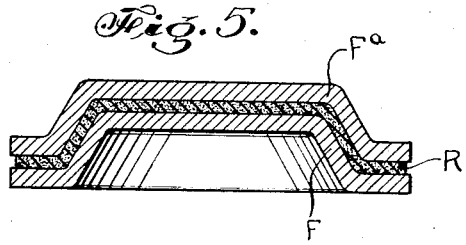
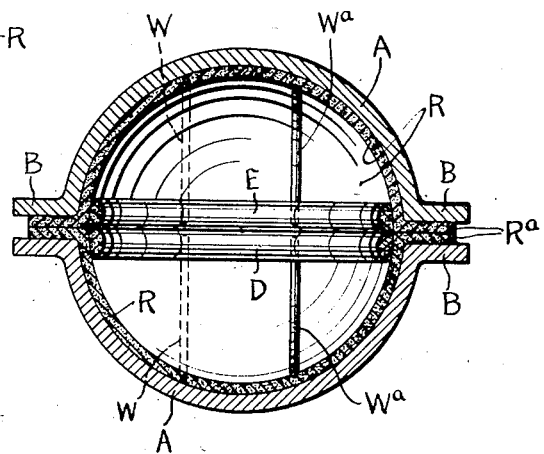
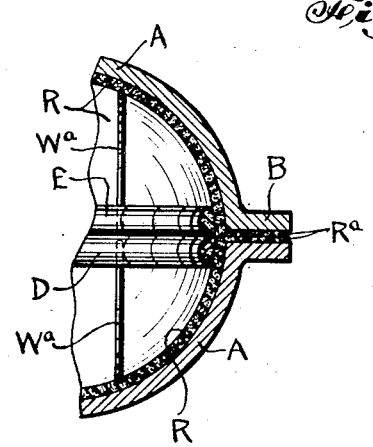
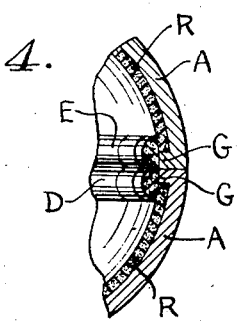

2,028,808

UNITED STATES PATENT OFFICE 2,028,808

RUBBER ARTICLE AND METHOD OF MAKING THE SAME

Levi M. Rosenthal, New York, N. Y.; Annie Rosenthal, New York, N. Y., executrix of said Levi M. Rosenthal, deceased Application July 1, 1933, Serial No. 678,571

11 Claims. (Cl. 18—58)

My invention relates to a new and improved rubber article, and a new and improved method of making the same.

One of the objects of my invention is to provide a new and improved rubber article of hollow shape.

The invention applies generally to all rubber articles, such as rubber balls, hollow rubber dolls, or other toys, hot-water bags, the inner tubes of tires, and it generally applies to all articles which have heretofore been made by joining together two or more sheets of sheet rubber, or which have been molded from a single sheet of rubber.

In certain aspects of the invention, the same is not limited to a hollow rubber article, as the invention generally applies to all articles which have heretofore been manufactured by joining two or more sheets of sheet rubber, or by molding a single sheet of rubber.

Another object of my invention is to greatly reduce the cost of manufacture by reducing the cost of the molds, and by making it unnecessary to utilize liquid or gas pressure, during the vulcanization operation.

Another object of my invention is to provide a method whereby the interior of a mold (which can be made in any desired number of sections) is lined with a suitable rubber compound in viscous form, and the rubber is then vulcanized by means of heat or the like.

Other objects of my invention will be set forth in the following description and drawing which illustrate a preferred embodiment thereof, it being understood that the above general statement of the objects of my invention is intended merely to generally explain the same and not to limit it in any manner.

Fig. 1 diagrammatically illustrates a mold section which is provided with a lining of rubber cement.

Fig. 2 shows a pair of mold sections suitably assembled in order to vulcanize the rubber.

Fig. 3 is a partial view of a pair of assembled molds.

Figs. 4 and 5 illustrate modifications.

Heretofore, in making articles such as rubber balls, hollow rubber toys, inner tubes of automobile tires, etc., it has been the universal practice to first make sheets of rubber by means of calenders or the like, to then assemble the sheets of rubber by forming joints, either by means of cement or rubber solvent or by welding, and to then vulcanize the assembled sheets in a mold while supplying a medium under suitable pressure within the interior of said mold, in order to firmly press the rubber sheets against the inner surfaces of the mold members.

In some methods it has been customary to force hot water under pressure into the interior of the mold and it also has been customary in other methods to force steam into the interior of the mold.

According to a third method, a chemical contained in a capsule has been placed into the interior of the mold, so as to release gas under pressure when the heat of vulcanization was applied. These methods were costly and uncertain.

According to my improved method, I first prepare the rubber compound in viscous or cement form. This is done by working up the rubber in a suitable mill with the added ingredients such as sulphur or other vulcanizing ingredient, and the various compounding ingredients which are ordinarily added to the pure rubber stock. The accelerators, anti-oxidants, and other ingredients, are also thoroughly intermixed with the rubber stock.

After the dry mixture has been thoroughly made, the mixture is put gradually into a churn, which contains naphtha, or other suitable rubber-solvent, and the naphtha is worked into the dry mass until a rubber cement has been made of suitable viscosity. The cement is sufficiently thick and viscous so that it will flow very slowly, and it is either applied by means of a brush or stick, or else it can be forced through a nozzle, under suitable pressure. In order to distinguish from the use of unvulcanized sheet rubber, I state that I spread the rubber material, since it is in spreadable form, it can be applied by the means previously mentioned.

Referring to the annexed drawing, Fig. 1 illustrates a semi-spherical mold A having a lip or flange B. The interior of the mold A and the corresponding surface of the flange B is provided with an inner layer of rubber R, and said inner layer is preferably of uniform thickness. This inner layer of rubber R is made by spreading the viscous rubber cement which has been previously described, upon the corresponding surfaces of the mold A and of the flange B.

In order to make an ordinary rubber ball, two such half-molds A can be used, or else the complete spherical mold can be divided into any desired number of sections such as six or eight or more.

In molding a large article the mold can be made of relatively few sections. In molding a small article such as a rubber ball of small diameter, the mold can be subdivided into a number of relatively large sections. That is, a greater curvature requires a larger number of mold sections.

If a nozzle is used for distributing the rubber cement, this can have any desired shape. If desired, the mouth or outlet of the nozzle can correspond in shape to the respective mold section, including the flange section thereof. Likewise any suitable mechanical movement can be utilized for producing a relative movement between the nozzle and the mold section, in order to deposit a layer of rubber cement R of uniform thickness.

For example, in making the inner tube of a tire, the mold can be divided into two or more annular sections. The outlet or mouth of the nozzle can generally correspond in shape and size to each of these sections, including the flange section thereof, so as to provide a layer R of uniform thickness. Likewise any excess thickness of rubber cement can be removed by hand or any suitable means.

When the mold sections have thus been lined with a rubber cement, said sections are assembled with their flange sections adjacent each other. This assembly is shown in Fig. 2, from which it can be seen that the mold sections are held together, without squeezing out the lip or flange sections of rubber cement, as these lip or flange sections are used for forming the joint between the respective parts of the article. If desired, some pressure can be applied to the mold sections when they are assembled so that the lip sections Ra of the rubber cement may be thinner than the body of said rubber cement, when the mold sections are assembled in the manner shown in Fig. 2.

The lip sections of the rubber cement may be made as thin as is desired, and said lip sections can also be made thicker than the body of the rubber cement, if this is desired. Since the rubber article is vulcanized while the rubber sections are unsupported by any interior pressure, the joints between the rubber sections are irregular, and the completed article can thus be distinguished from an article which has been made by the use of ordinary sheet rubber, as for example an article made according to U. S. Patent No. 1,400,146 issued on December 13, 1921.

The final article has superior strength because it is not necessary to work the rubber on the mixing mill in order to form sheet rubber.

According to my invention the ingredients may be mixed together with the use of a solvent which enlarges or swells the rubber. After the rubber material has reached the desired consistency, said material is deposited in the form or mould and it is then vulcanized.

Likewise while I have referred to making the rubber article of uniform thickness, it is a great advantage of my method that added thickness can be conveniently provided whenever desired, by merely depositing additional rubber cement at any desired part or parts of the article to be molded. The provision of such extra thickness is difficult and costly when the article is made of sheet rubber, and it is a great advantage of my invention that the article can be provided with internal ribs D and E or any other desired reinforced structure, by suitably depositing the rubber cement, to form said ribs.

Likewise reinforcing members W and Wa made of a bendable or resilient material can be provided. These reinforcing members may be metal wire, for example. For this purpose, a preliminary layer of rubber cement of any desired thickness may be applied to the interior of the mold, and the reinforcing members can then be placed upon this preliminary layer of rubber cement. Said reinforcing members will be held spaced from each other by said rubber cement. Additional rubber cement can then be applied, so that the reinforcing members W are completely imbedded in the rubber cement.

If desired, reinforcing members Wa can partially project from the inner surface of the molded article.

Likewise said reinforcing members may be flush or substantially flush with the outer surface of the rubber article, if desired. Likewise the rubber article may be formed with one or more openings therein, as for example in making a hot water bag.

Likewise any suitable metal member, such as the nipple of a hot water bag, can be held within the mold, while the rubber cement is being applied, so that the vulcanized article will have the nipple already in position.

Various other modifications can be utilized, depending upon the nature of the article to be manufactured.

The assembled parts shown in Fig. 2 are then placed in a suitable vulcanizing chamber which may be provided with steam in the usual manner. Likewise the vulcanization may be accomplished by means of dry heat, by merely placing the assembled mold sections in a suitably heated chamber which may be heated by a steam jacket or the like.

Before assembling the molds in the manner shown in Fig. 2, and before vulcanizing the rubber, most of the solvent is allowed to evaporate. This evaporation is very rapid and it is accomplished at ordinary room temperature. The choice of the solvent and the rapidity of the evaporation thereof may depend upon the size of the rubber article because if a large mold is to be lined with the rubber cement, it is preferred that the solvent should not evaporate as rapidly as if a small article is being made.

During the vulcanization, the mold is not subjected to any excessive pressure, either internal or external. It is not necessary to introduce any fluid under pressure (either liquid or gas), into the interior of the assembled molds. Hence it is not necessary to make expensive and strong molds, and the molds or mold sections can be quickly or easily stamped out of tin plate or duralumin.

I prefer to make the mold out of rust-proof material, or to provide said molds with a rust-proof coating or plating. This facilitates the production of a colored rubber which has the desired true color, because the color of a rubber compound is affected if it comes into contact with a metallic oxide (produced by rusting), during the vulcanization.

According to my method, I can utilize absolutely dry heat for performing the vulcanization, so that the rusting is minimized.

The completed rubber article is provided with a lip or lips, depending upon the method of manufacture. Ordinarily the completed article has a single lip, which corresponds to the lip or flange portions Ra of the rubber cement. This lip is not objectionable in the manufacture of hot water bags, rubber balls, etc. Where such lip is objectionable, it may be removed by any suitable cutting operation, so as to provide a substantially smooth exterior for the completed rubber article. Such smooth exterior is desirable in making the inner tubes of automobile tires although a small lip is not objectionable.

It will be noted that the rubber article is joined at a line in the interior of the rubber article. Likewise additional rubber cement may be deposited at the zones D and E, in order to reinforce the rubber article at the joint thereof. Hence the lip or flange portions Ra can be made of minimum width, because the completed article does not depend upon the lip for holding the parts thereof together.

If desired, the flange sections B can be corrugated or fluted, either longitudinally or laterally (radially) so as to provide a stronger joint for the completed article. Likewise the rubber cement may be of different grades, one kind having much more rubber than the other. The higher grade compound can be used for forming the exterior of the article, and the lower grade compound can be used for forming the interior of the article.

As illustrating the flexibility of the method disclosed herein, it has been proposed to make dolls having skeletons made of aluminum or other metal and to cover such skeletons with a thick rubber skin, in order to produce a light and hollow doll whose outer surface has a natural flesh cover, said outer surface being made of rubber.

According to my invention, the skeleton can be assembled so as to provide an inner form, the viscous and tacky rubber cement can be deposited upon the inner surfaces of mold members, and the mold members can be placed around the form, so that the form is partially or wholly imbedded in the cement. The cement is then vulcanized, the mold members are removed, and the cement forms a complete vulcanized covering for the skeleton, so as to simulate any type of rubber doll or toy or form of any kind.

This method can be used for forming a complete or partial jacket for a barrel or other article. This jacket remains vulcanized to the barrel or the like, and forms an outer protective cushion.

If desired, the interior surface of the mold section or sections can be dusted or coated with an anti-adhesive compound, in order to prevent the vulcanized rubber from clinging to the mold section or sections. However it is a great advantage of my invention to have the mold section or sections made of smooth and highly polished tin plate, or similar material, so that it is not necessary to provide any anti-adhesive material.

The elimination of the anti-adhesive material makes it possible to provide the rubber article with maximum strength and in any desired color, because the use of anti-adhesive material would affect the surface color of the article.

If it is desired to manufacture a rubber article of concave form such as one-half of a doll body or a rubber dish or the like, I can use male and female mold members F and Fa of the usual type, the cement being applied to the adjacent surfaces of the said mold members, or to the outer surface of member F.

Whenever I refer to an article made of rubber, it is to be understood that I include pure rubber and compounded rubber of every type.

While I have referred heretofore to the admixing of rubber with a solvent, in order to produce the rubber material in viscous form, I do not wish to be limited to this. For example, it is well known that latex can be admixed with suitable materials, or be suitably treated, so as to produce a viscous material. Such material can be defined as being rubber material in viscous form, even though it may not contain a solvent for rubber. Whenever I refer to unvulcanized rubber in viscous form, I refer to rubber which is sufficiently adhesive to cling to the interior of the mold while the rubber is unvulcanized, and said rubber does not flow when it is deposited upon the interior surface of the mold. The rubber may be designated as being self-adherent, because it does not require the use of gas pressure to hold it against the mold, during heat vulcanization.

Referring to Fig. 4, this illustrates the formation of an article, such as a rubber ball, without a lip. The mold sections A have internal lips G, about which the layers of rubber cement D and E are deposited. The rubber article is thus formed with a circumferential depression (which may be very narrow and shallow) in its outer wall. The vulcanized layers D and E reinforce the joint.

While I have previously referred to the evaporation of naphtha or other solvent for the rubber, this evaporation need not be complete, and in actual practice such evaporation is never complete prior to vulcanization. Enough naphtha must be retained so as to cause the unvulcanized rubber material to adhere to the inner surface of the mold. However, enough naphtha must be evaporated so as to prevent the generation of excessive vapor during the heat vulcanization. Since the mold sections are not clamped together with any great force, the generation of such vapor would cause the seam or joint between the rubber sections to open, and this would be highly undesirable.

The rubber compound which is used in practicing my invention may be of a type which produces a resilient rubber. Likewise, the rubber may be so compounded as to produce a hard rubber when the same is vulcanized, so that the invention can be used for making the parts of fountain pens, and other parts which are now made of hard rubber.

While I have referred to the production of hollow rubber articles, the invention also applies to the production of flat or planar rubber articles.

Since the unvulcanized rubber material tends to soften and to flow if the same is heated too high, I prefer to use as low a vulcanization temperature as is practical and to have the vulcanization period as short as is practical.

In making an ordinary article out of viscous rubber cement or the like, which has a large percentage of pure rubber, I prefer that the vulcanization temperature should not exceed 220° F., it being noted that the sulphur does not begin to combine with the rubber until the temperature exceeds about 175° or 180° F.

Indeed, in making a thin rubber article, such an article having a thickness of about .04 inch, I can use a vulcanization temperature as low as 185° F., and vulcanize the rubber for a period of thirty minutes or more, at said temperature. This period of treatment at the vulcanization temperature is longer than the usual treatment at vulcanization temperature. That is, in prior practice in using thick iron molds, the molds were slowly heated to a vulcanization temperature which was more than 220° F., and the rubber was kept at the highest temperature for ten minutes or less.

After the vulcanization has been completed, the completed article, together with the molds, should be allowed to cool as quickly as possible. For this purpose the mold sections can be made of thin material such as tin plate of about No. 30 gauge (having a thickness of approximately .0125 inch).

If desired, a rubber garment can be made by using suitable molds which correspond to the parts of a garment.

By assembling these molds, the unvulcanized viscous rubber material assumes the contour of a garment. When the rubber material has been vulcanized, it can be removed from the molds, thus producing a complete garment without the necessity of cementing or otherwise joining the various parts of the garment. If desired, the rubber compound can be applied by spraying.

An article made according to my method is completely formed from unvulcanized rubber material which has been joined so as to be vulcanized in situ. Hence the completed rubber article has a joint, such as a flange or the like, which is superior in strength to an article made by cementing or pressing together, sheets of unvulcanized rubber.

Likewise the thickness of the lip or flange can be less than the thickness of the body of an article.

If the interior of a seam of the improved article made according to my invention is examined, it can be seen that the seam is irregular, whereas the seam which is produced by connecting two sheets of sheet rubber is regular, and follows a definite plane.

The use of thin molds of high conductivity and of low thermal capacity is an important feature of the invention. This enables the viscous rubber material to be very quickly heated and vulcanized, if the temperature of vulcanization is 212° F., and even less. If the solvent is completely evaporated from the cement during the initial stage of the vulcanization, it does not cling properly to the interior of the mold. By drying in air at ordinary room temperature of about 70° F., enough solvent can be driven off, while retaining the tackiness of the cement. The vulcanizing heat then passes very quickly through the thin mold, thus beginning the vulcanization of the rubber before the heat completely drives off the residual solvent. This causes the rubber material to cling to the mold, and to retain the desired shape, until the vulcanization is completed.

Whenever I refer to the deposition of rubber material, it is to be understood that I exclude the use of sheet rubber.

I have shown preferred embodiments of my invention, but it is clear that numerous changes and omissions could be made without departing from its spirit.

Referring to Fig. 5, the principle illustrated therein can be applied with the use of a mold of any shape. For example, a figure corresponding to the upper part of the body of a human being can be covered with the cement, so as to form a cement covering which corresponds to a coat, and which has arms and sleeves. Said coating of rubber cement may be interrupted along a suitable line. Corresponding outer molds may be placed over and in contact with the rubber cement, and the molds can be heated, to vulcanize the cement. The outer molds can then be removed, and the vulcanized rubber coat can be removed from the form.

I claim:
1. A method of making a rubber article which consists in depositing upon the surface of a mold member the unvulcanized rubber material intermixed with solvent and in viscous form, and then vulcanizing the rubber by heat, said rubber material being permitted to retain sufficient solvent prior to complete vulcanization to cause it to adhere to the mold member.

2. A method of forming a hollow rubber article which consists in spreading the unvulcanized rubber material in viscous and self-adherent form upon the surfaces of a plurality of mold sections which are provided with lips, said unvulcanized rubber material being also deposited upon said lips, assembling said mold members so that the unvulcanized rubber material has the conformation of the desired article and the lip portions of said unvulcanized rubber material contact with each other, and then vulcanizing said rubber material by heat while said mold members are held in said relative position, the vulcanization being completed before the rubber material has lost its adherence to the mold sections.

3. A method of forming a hollow rubber article which consists in spreading the unvulcanized rubber material in viscous and self-adherent form upon the surfaces of a plurality of mold sections which are provided with lips, said unvulcanized rubber material being also deposited upon said lips, assembling said mold members so that the unvulcanized rubber material has the conformation of the desired article and the lip portions of said unvulcanized rubber material contact with each other, then vulcanizing said rubber material by heat while said mold members are held in said relative position, and then trimming the vulcanized rubber lip which is thus formed, the vulcanization being completed before the rubber material has lost its adherence to the mold sections.

4. A method of forming a hollow rubber article which consists in spreading unvulcanized rubber in viscous and self-adherent form upon the surfaces of a plurality of mold sections while depositing said material in greater thickness at the margins of said mold sections, assembling the mold sections so that the unvulcanized rubber material has the configuration of the desired article, and then vulcanizing the rubber material by heat while the mold sections are held in said relative position, the vulcanization being completed before the rubber material has lost its adherence to the mold sections.

5. A method of making a rubber article which consists in depositing upon the interior surface of a mold member, unvulcanized rubber material in viscous and self-adherent form and intermixed with a solvent for rubber, allowing the solvent to partly evaporate while retaining said self-adherent state, and then vulcanizing the rubber material by heat.

6. A method of forming a hollow rubber article which consists in depositing unvulcanized rubber in viscous and self-adherent form and intermixed with a rubber-solvent upon the surfaces of a plurality of mold sections, allowing the solvent to partly evaporate while causing said material to retain said self-adherent state, assembling said mold sections so that the unvulcanized rubber material has the configuration of the rubber article, and then vulcanizing said rubber material by heat while the mold sections are held in such relative position.

7. A method of making a rubber article which consists in coating the surface of a mold with unvulcanized rubber material in viscous and tacky form, so as to form a substantially closed body, said rubber material having a vulcanizing agent intermixed therewith and then vulcanizing the rubber by heat at a temperature which is sufficiently low to cause the rubber material to remain self-adherent to said surface during the vulcanization.

8. A method of making a rubber article which consists in coating the smooth surface of a mold with unvulcanized rubber material in viscous and tacky form so as to form a substantially closed body, said rubber material being intermixed with a vulcanizing agent and containing a rubber-solvent in sufficient proportion to make the rubber material self-adherent to the mold surface, and then vulcanizing the rubber by heat and driving off the residual solvent, at a temperature which is sufficiently low to cause the rubber material to remain self-adherent to said surface and to maintain its general shape and thickness, during the vulcanization, and then separating the vulcanized rubber article from the mold.

9. A method of making a hollow rubber article which consists in coating the interior surfaces of a mold which consists of a plurality of sections, with rubber material in moist and viscous and tacky form, and vulcanizing said rubber material while said sections are held in assembled relation, the vulcanization being conducted under heat and with sufficient rapidity to vulcanize the rubber material while it retains its adherence to the mold sections.

10. A method of forming a hollow rubber article which consists in spreading the unvulcanized rubber in viscous and adherent form upon the surfaces of a plurality of mold sections so that the rubber adheres to said mold sections, said rubber having vulcanizing material intermixed therewith, then assembling the mold members so that the unvulcanized rubber material has the conformation of the desired article, and then vulcanizing the rubber by heat and with sufficient rapidity so that the adherence of the rubber maintains it in the desired shape during the vulcanization.

11. A vulcanized rubber article consisting of a plurality of sections of vulcanized rubber which are vulcanized to each other, each said section having been formed by vulcanizing a layer of viscous rubber material while said rubber material was in self-adherent form and while said material was held by its self-adherence on a form, said sections having merged portions.

LEVI M. ROSENTHAL.